United States Patent Office 3,416,323
Patented Dec. 17, 1968

3,416,323
LOW TEMPERATURE PRODUCTION OF HIGHLY COMPRESSED GASEOUS AND/OR LIQUID OXYGEN
Peter Heinik, Grunwald, Germany, assignor to Linde A.G., Wiesbaden, Germany
Filed Jan. 13, 1967, Ser. No. 609,153
Claims priority, application Germany, Jan. 13, 1966, L 52,585
3 Claims. (Cl. 62—18)

ABSTRACT OF THE DISCLOSURE

High pressure oxygen production using adsorbers to clean air, wherein nitrogen overhead is treated in the order: (1) to subcool reflux or feed; (2) warmed by air-to-be-separated; (3) expanded to provide make-up refrigeration; and (4) warmed to normal air temperature by freshly cleansed incoming air-to-be-separated.

This invention relates to a process for the production of highly compressed gaseous and/or liquid oxygen by the low temperature separation of air. In particular, the present invention is directed to such systems wherein the oxygen is withdrawn in the liquid phase from a rectification column operating under increased pressure, is brought, at least partially, to a higher pressure by means of a pump and is evaporated at this elevated pressure by heat exchange with compressed air to be separated and warmed to normal temperature; and wherein the required refrigeration energy is produced by engine expansion of the rectification overhead gas. (In this connection, the term "engine expansion" refers to expansion with the production of external work.)

A long-standing goal in the cryogenic gas industry has been the development of economical, high pressure oxygen producing systems of relatively moderate and low capacities. These systems should require minimum initial investment, and should reflect minimum operating costs. To do this, the raw air compression should be as low as possible, and the production of make-up refrigeration should be accomplished in an uncomplicated system, in order to maintain the required low temperatures.

Accordingly, it is an object of this invention to provide an improved system for the production of high pressure oxygen gas and/or liquid.

Upon further study of the specification and claims, other objects and advantages of the present invention will become apparent.

To attain these objectives, there is provided a system comprising (a) evaporating liquid oxygen under supercritical pressure by heat exchange with air to be separated; (b) prewarming the overhead column gas by reflux liquid; (c) warming the prewarmed gas from 100–105° K. to 127–148° K., by heat exchange with separation air; (d) engine-expanding the resultant warmed column overhead gas; and (e) reheating the resultant cooled engine expanded gas by heat exchange with air to be separated.

Figure 1:
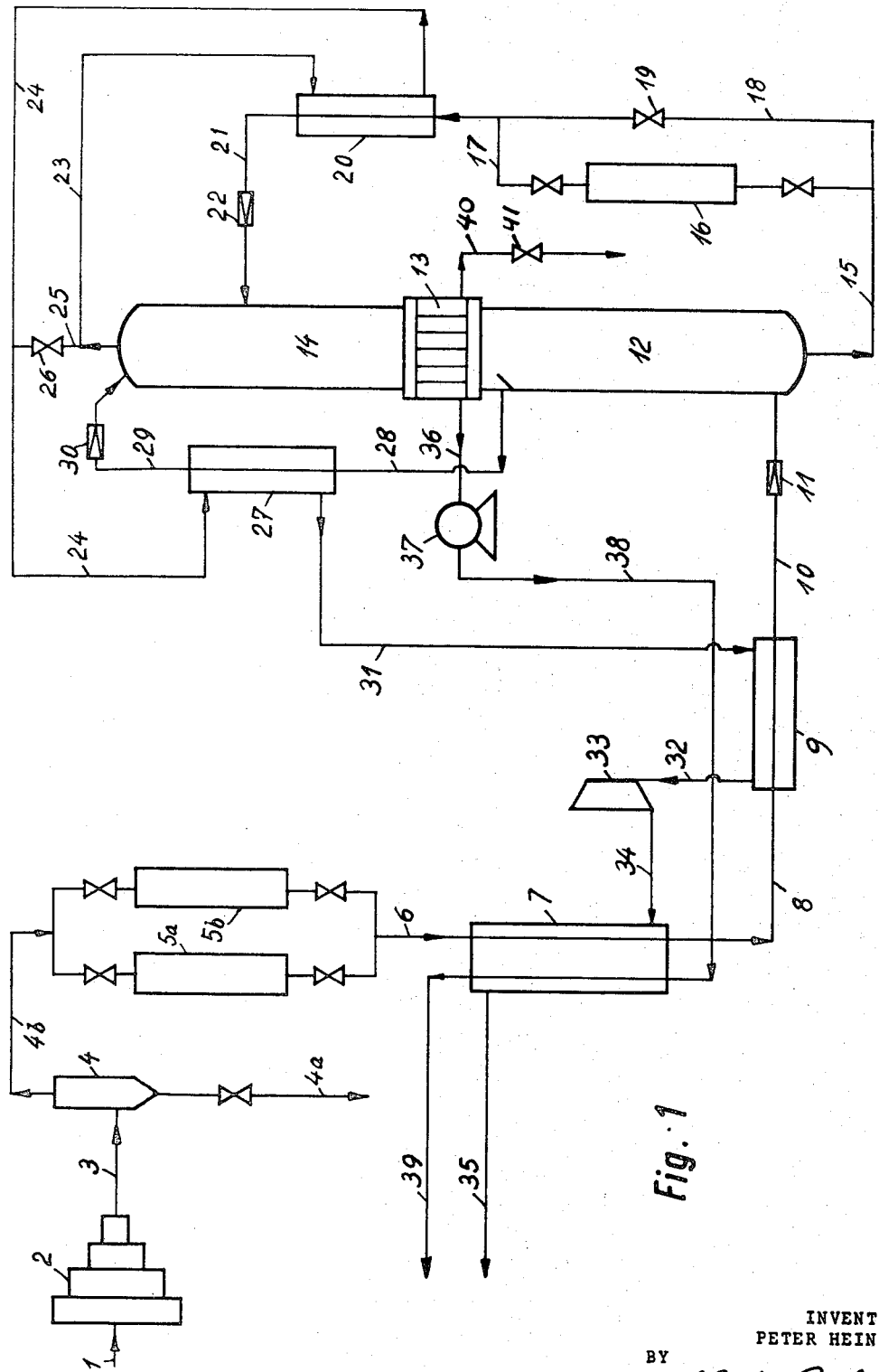
Figure 2:
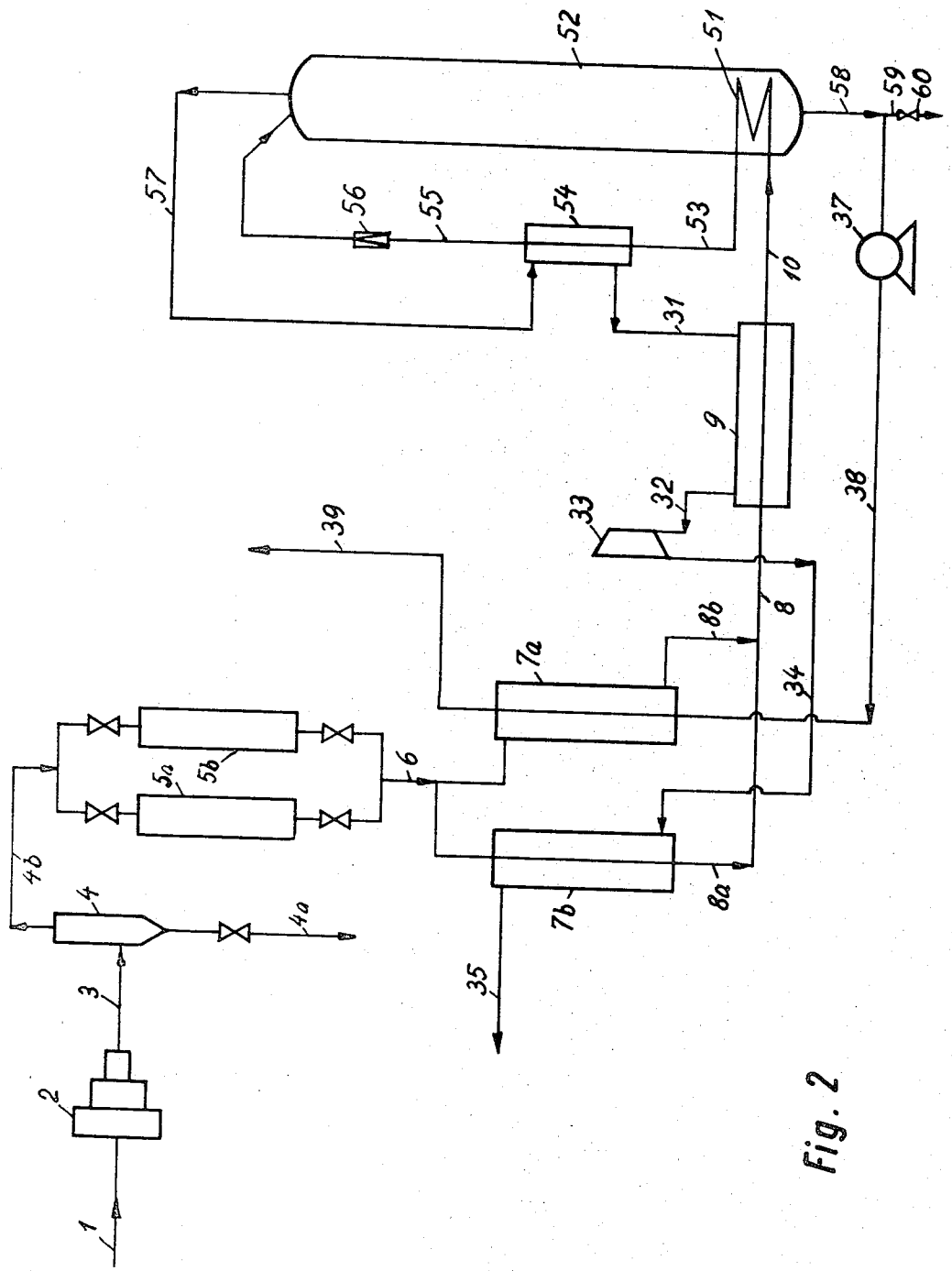

In the drawings:
FIGURE 1 is a schematic illustration of a preferred embodiment employing a double column; and
FIGURE 2 is a preferred embodiment illustrating the use of a single column.

At such plants oxygen is used at a pressure normally above 50 atmospheres, at most 200–220 atmospheres. Therefore the evaporation of the oxygen must be effected at a supercritical pressure. If the oxygen is evaporated at a lower pressure there are greater losses at the heat exchange between oxygen and air, but no savings of energy.

For plants of a somewhat larger capacity, e.g., about 100,000 Nm.$^3$ O$_2$/day, it is advisable in most cases to employ a double column rectification column for purposes of process economics. In such cases, the process of this invention comprises compressing air to a pressure of 40–50 atmospheres absolute, passing the compressed raw gas through alternating adsorbers for the removal of water and carbon dioxide; passing the cleansed gas in indirect heat exchange with product oxygen and product nitrogen; and then via an expansion valve, to the high pressure section of a double column rectifying tower, operating under about 8–12 atmospheres absolute. The overhead nitrogen from the low pressure column (operating at about 2.5–4 atmospheres absolute), is passed in indirect countercurrent heat exchange with reflux, to sub-cool the latter. The resultant warmed overhead vapor is then further warmed in indirect heat exchange relationship with air to be separated; the overhead gas is then engine expanded, and the resultant cooled overhead stream is finally heat exchanged with incoming cleansed air to be separated.

In small air fractionation plants wherein important factors are efficient space utilization, equipment of low height being desirable, it is advantageous to operate with a single column rectification tower. In that case, the process is conducted so that air compressed to a pressure of 25–30 atmospheres absolute is expanded into the head of the rectification column operating at 3–10 atmospheres absolute. Intermediate steps comprise passing the air through alternating adsorbers for the removal of water and carbon dioxide, through heat exchangers traversed by (a) product oxygen, (b) product nitrogen, and (c) sump liquid. The overhead nitrogen containing a small quantity of oxygen, is fed from the top of the column to a countercurrent heat exchanger for sub-cooling reflux. The prewarmed overhead stream is then warmed in indirect heat exchange with air to be separated, and the resultant warmed overhead is then engine expanded to cool same. The cooled overhead is then warmed to normal temperature by further heat exchange with incoming freshly cleansed air to be separated.

The process of this invention will be explained in more detail with reference to the two preferred specific comprehensive embodiments illustrated in the schematic views of FIGURES 1 and 2.

Approximately 400 Nm.$^3$/h. of air pass through conduit 1 to the compressor 2 and are therein compressed to about 50 atmospheres absolute. The compressed air is cooled, in a conventional manner, to normal temperature and passes through conduicit 3 to the separator 4 from which the water can be withdrawn at 4$a$. The predried air then passes through conduit 4$b$ to the switchable adsorber group 5$a$, $b$ wherein it is freed of the residual amount of water and the carbon dioxide contained therein.

The purified compressed air then passes through conduit 6 to the heat exchanger 7 and further via conduit 8, heat exchanger 9, conduit 10, and expansion valve 11, into the sump of the high pressure column 12 of the double rectifier 12–14, reference numeral 13 designating the condenser-evaporator separating the two columns. Oxygen-enriched liquid air is now supplied from the sump of the high pressure column 12 via line 15, adsorber 16, and conduit 17 (optionally through bypass line 18 provided with valve 19), and then through heat exchanger 20, conduit 21, expansion valve 22, into the low pressure column.

The nitrogen withdrawn from the head of the low pressure column 14 passes, through conduit 23, to the heat exchanger 20 in indirect heat exchange relationship with oxygen-enriched air. The nitrogen is then withdrawn from heat exchanger 20 via conduit 24. Between the conduits 23 and 24, a bypass line 25 with a control valve 26 can be incorporated in order to regulate the delivery rate of nitrogen to the heat exchanger 20. The conduit 24 then leads to the shell side of the sub-cooling countercurrent exchanger 27, the tubes of which contain liquid nitrogen obtained via conduit 28 from the head of the high pressure column. The sub-cooled liquid nitrogen is then fed, via conduit 29 and expansion valve 30, to the head of the low pressure column.

The overhead nitrogen from the low pressure column, prewarmed in the heat exchanger 27, then passes through conduit 31 to the heat exchanger 9 and from there, via conduit 32, to the expansion turbine 33. In the heat exchanger 27, the nitrogen has already been prewarmed to about 104° K. A further prewarming of the nitrogen to about 146° K. is then conducted in the heat exchanger 9. The expanded nitrogen exiting from the turbine then has a temperature of about 122° K.; this nitrogen passes via conduit 34 to the heat exchanger 7 where it is heated to a temperature of about 297° K. under a pressure of about 1.1 atmospheres absolute, and is passed on to further processing thereof via conduit 35. At this point, there are obtained approximately 340 Nm.$^3$/h. of impure nitrogen.

From the sump of the low pressure column 14, about 60 Nm.$^3$/h. of liquid oxygen having a purity of 99.5% are withdrawn via conduit 36. The liquid oxygen is compressed to a pressure of about 220 atmospheres absolute in the pump 37; at this pressure, it passes through conduit 38 to the heat exchanger 7 and is fed from there, via conduit 39, in the gaseous phase, for example, to a cylinder filling station (temperature: about 292° K., pressure: about 220 atmospheres absolute).

If not the entire oxygen product is to be obtained in a highly compressed gaseous form, a desired proportion, or even the entire yield, can be withdrawn in the liquid phase from the sump of the low pressure column via conduit 40 through throttle valve 41, and can then be stored.

The more liquid oxygen to be produced in addition to compressed gaseous oxygen, the higher the pressure to be employed in the double rectifier, so that the required additional refrigeration can be produced in the expansion turbine 33.

In this connection, it is essential that the nitrogen is substantially prewarmed in the heat exchanger 9 in indirect heat exchange relationship with which the air enters at about 150° K., and exits at about 140° K.

The evaporation and warming of the high pressure oxygen, entering the heat exchanger 7 at about 117° K., are here conducted by means of the cleansed air to be separated. The expanded nitrogen is passed through the shell of the heat exchanger and serves as an intermediary heat exchange medium.

By the interposition of the heat exchanger 9, the production of refrigeration in the expansion turbine 33 is increased to such an extent that the raw air compression pressure can be reduced, from the otherwise required 90 atmospheres absolute, to 50 atmospheres absolute which, of course, results in highly improved process economics. Without the heat exchanger 9, additional refrigeration would have to be produced by the Joule-Thomson effect in expansion valve 11.

The schematic view of FIGURE 2 illustrates a system particularly applicable to small plants. The compressor 2, in this connection, can be equipped with one stage less. About 450 Nm./h. of air are compressed to a pressure of about 30 atmospheres absolute. The heat exchanger 7 is divided into two sections 7a and 7b. The air to be separated from conduit 6 flows through the shell of the heat exchanger 7a, but it flows through the tubes of the heat exchanger 7b. The tubes of the heat exchanger 7a carry high pressure oxygen, while the shell of the heat exchanger 7b carries the expanded nitrogen.

The low-temperature cooled compressed air passes, in this embodiment, from conduit 10 to a sump heating coil 51 in the single column rectification column 52. The air, liquefied therein, passes through conduit 53 to the subcooling countercurrent device 54 and from there, via conduit 55 provided with expansion valve 56, to the head of the column 52.

The overhead product from the column, still containing a small amount of oxygen, flows through conduit 57 via the heat exchanger 54 again, via conduit 31, to the heat exchanger 9.

The liquid oxygen from the sump of the column passes through conduit 58 to the pump 37. From conduit 58, liquid oxygen can be withdrawn via conduit 59 provided with valve 60, for storage or direct delivery to the consumer. The yield in oxygen is about 55 Nm.$^3$/h., whereas there are withdrawn about 395 Nm.$^3$/h. of impure nitrogen. The nitrogen in conduit 31 has a temperature of about 103° K., and after passing the heat exchanger 9, leaves in conduit 32, at about 130° K. The air to be separated is thereby cooled in heat exchanger 9 from 132 to about 127° K. The expanded nitrogen enters the heat exchanger 7b at about 106° K.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a process for the low temperature fractionation of air wherein liquid oxygen is withdrawn from a rectification column, is at least partially pumped to a higher pressure, and is evaporated under this higher pressure by heat exchange with compressed air to be separated and warmed to normal temperature; and wherein make-up refrigeration is produced by engine expansion of the rectification column overhead gas, the improvement comprising evaporating said liquid oxygen under supercritical pressure; prewarming rectification column overhead gas by heat exchange with reflux liquid, further warming prewarmed gas from 100–105° K. to 127–148° K., by heat exchange with air to be separated, said engine expanding being of resultant warmed, 127–148° K., overhead gas; and reheating resultant cooled engine expanded air by heat exchange with incoming freshly cleansed air to be separated.

2. A process as defined by claim 1, further comprising compressing raw air to be separated to a pressure of 40–50 atmospheres absolute; passing resultant compressed air through an adsorber for the removal of water and carbon dioxide; and wherein the rectification comprises a double column having a high pressure section operating at about 9–12 atmospheres absolute, and a low pressure column, operating at about 2.5 to 4 atmospheres absolute.

3. A process as defined by claim 1, further comprising compressing raw air to be separated to a pressure of 25–30 atmospheres absolute; passing resultant compressed air through an adsorber for the removal of water and carbon dioxide, and wherein said rectification column is a single column rectification column.

(References on following page)

References Cited

UNITED STATES PATENTS

| | | | |
|---|---|---|---|
| 2,503,939 | 4/1950 | De Baufre | 62—18 XR |
| 2,822,675 | 2/1958 | Grenier | 62—41 XR |
| 2,915,882 | 12/1959 | Schuftan | 62—38 XR |
| 2,918,802 | 12/1959 | Grunberg | 62—41 XR |
| 2,968,160 | 1/1961 | Schilling | 62—14 |
| 3,070,966 | 1/1963 | Ruhemann et al. | 62—39 XR |
| 3,257,814 | 6/1966 | Carbonell | 62—39 XR |

FOREIGN PATENTS 752,439  1/1953  Germany.

NORMAN YUDKOFF, *Primary Examiner.*
V. WALTER PRETKA, *Assistant Examiner.*

U.S. Cl. X.R.

62—29, 39, 41, 13